United States Patent
Borngasser

[11] Patent Number: 6,150,619
[45] Date of Patent: Nov. 21, 2000

[54] SUPPORT BASE FOR A MEASURING CELL

[76] Inventor: Johannes Borngasser, Am Kulturhaus 8, D-19372 Dütschow, Germany

[21] Appl. No.: 09/194,720

[22] PCT Filed: Jun. 20, 1997

[86] PCT No.: PCT/DE97/01266

§ 371 Date: Jan. 29, 1999

§ 102(e) Date: Jan. 29, 1999

[87] PCT Pub. No.: WO98/00688

PCT Pub. Date: Jan. 8, 1998

[30] Foreign Application Priority Data

Jun. 28, 1996 [DE] Germany .......................... 196 25 821

[51] Int. Cl.[7] ..................................................... G01G 1/00
[52] U.S. Cl. ...................................... 177/201; 177/DIG. 9
[58] Field of Search ..................................... 177/201, 202, 177/DIG. 9

[56] References Cited

U.S. PATENT DOCUMENTS

| | | | |
|---|---|---|---|
| 2,714,536 | 8/1955 | Wirth | 177/201 |
| 4,219,091 | 8/1980 | Kleinhans | 177/211 |
| 4,258,810 | 3/1981 | Susor | 177/128 |
| 4,483,404 | 11/1984 | Weihs | 177/255 |
| 4,804,053 | 2/1989 | Nordstrom | 177/211 |

FOREIGN PATENT DOCUMENTS

| | | |
|---|---|---|
| 0 319 411 | 6/1989 | European Pat. Off. . |
| 0 361 518 | 4/1990 | European Pat. Off. . |
| 83 03 337 | 7/1983 | Germany . |
| 92 13 163 | 1/1993 | Germany . |
| 94 13 947 | 12/1994 | Germany . |
| 94 19 696 | 3/1995 | Germany . |
| 250939 | 9/1947 | Switzerland . |

*Primary Examiner*—Randy W. Gibson
*Attorney, Agent, or Firm*—Darby & Darby

[57] ABSTRACT

A support base for a measuring cell including a base plate with a bore and an annular groove defined therein, and a planar pressure surface machined therein. A load pin is connected to the base plate to provide articulated support for a load. The load pin has a threaded shank adaptable to adjust its height relative to the measuring cell and terminates in a pressure head with a convex pressure surface and an annular groove defined therein. The pressure head of the load pin is inserted with play into the bore of said base plate. A resilient ring is disposed between the annular grooves to connect the base plate and the pressure head.

4 Claims, 1 Drawing Sheet

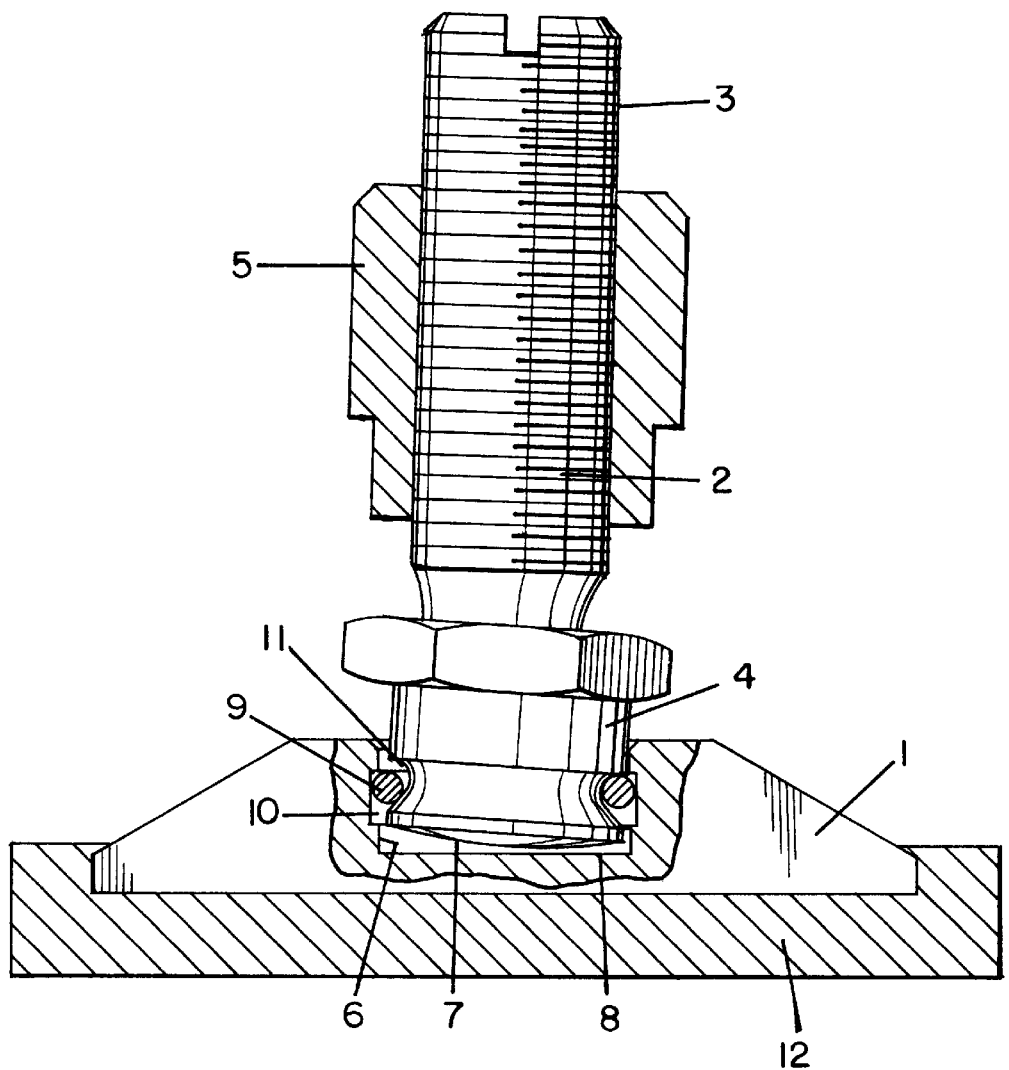

SUPPORT BASE FOR A MEASURING CELL

BACKGROUND OF THE INVENTION

1. Field of the Invention

The present invention relates to a support base for a measuring cell.

2. Description of Related Art

Support bases of this type and associated measuring cells are used primarily with scales, but for the installation of machines.

A scale can be constructed as a platform scale or a tank scale and can include a weighing platform with at least three support bases and an equal number of measuring cells that respond to a pressure and to a twisting or shear load. Each support base is associated with a measuring cell.

The support bases and the measuring cells are arranged at a certain distance from each other inside the platform area of the scale. The measuring cells represent elements that connect the weighing platform with the support bases. In other words, the housing of the measuring cells is secured to the weighing platform, whereas the measuring arm is attached to the support base.

These scales are typically preassembled in the factory and are then adjusted at the installation site to conform to the local conditions.

The support bases are designed to receive the load to be measured and to exert a matching counter force, without substantially affecting the measuring cell. The support bases must therefore be articulated and able to support a large force. The height of the support base must also be adjustable.

Several types of support bases are known in the art. For example, European Patent No. 319 411 describes a support base with a joint consisting of a load pin that is under pressure and has a pressure head and a guided ball. The pressure head and the ball are clamped without clearance in a flexible rubber or plastic body. The ball is supported by the bottom surface of the base plate and the rubber or plastic body is supported by an outside wall of the base plate.

The joint described in the European Patent, however, is only able to transmit small forces because the ball contacts the planar surfaces the pressure head and the base plate, respectively, only at a single point and can therefore cause an indentation in the material. Even the selection of an extremely hard material cannot overcome this disadvantage. It is possible to increase the effective contact area by increasing the diameter of the ball. This approach, however, also increases the overall height of the support base and the scale which is a further disadvantage.

Another disadvantage is that since the connection between the pressure head and the rubber or plastic body does not provide any play, a displacement of the load pin distorts the rubber or plastic which, in turn, may affect the measurement process and misstate the results.

German Patent No. 83 03 337.8 U1 describes a joint having a ball that contacts an upper pressure plate and a lower pressure plate. Both pressure plates include a concave pressure surface facing the ball.

The concave shape of the surface areas slightly increases the contact area and thereby also the load bearing capacity. However the large diameter of the ball requires a relatively large support base.

Furthermore, if the load and the weighing platform move horizontally, then the ball may disadvantageously roll off and cause the pressure plates to come apart due to the concave shape of their surface area, thereby producing distortion and measurement errors.

German Patent No. 92 13 163.8 U1 describes a joint that includes a load pin under tensile load and is supported on both sides by respective bearings. Each of the bearings is formed by a spherical disk and a ball socket having contact surfaces of matching shape and size. This joint also produces measurement errors if the individual force transmitting elements became vertically misaligned. If the weighing platform is subjected to a lateral load or if the base plate is inclined, then the spherical disk and the ball socket would have to be able to slide relative to each other. This relative sliding motion of the components which is required for relative movement and displacement, requires adequate play between the two components that may noticeably distort the measurement results. The sliding friction also causes excessive wear of the components. Moreover, only small forces can be transmitted since the load is carried only by the screw connection located on both sides of the load pin.

Swiss Patent No. 0 250 939 discloses a stand and safety support device for truck scales wherein the support members are in the form of articulated columns. The support members have spherical ends and flat support surfaces.

German Patent No. 94 13 947.4 also describes a support base for weighing cells supported by a floor. The support base includes a pressure block with a flat pressure surface and a pressure element with a spherical pressure surface. Both pressure elements are pressed into a resilient rubber body.

European Patent No. 0 361 518 describes a platform scale with a support strut positioned inside a through hold located in the force measuring cell. A counter plate is arranged on the support strut, with an annular gap interposed between the support strut and the counter plate.

It is therefore an object of the present invention to develop a support base of the aforedescribed type that provides a joint with a large effective contact area, wherein a displacement of the joint does not require play and does not change the height of the support base.

SUMMARY OF THE INVENTION

In a preferred embodiment the support base for a measuring cell in accordance with the present invention includes a base plate with a bore having a planar pressure surface machined into the base plate and a load pin with a pressure head having a convex pressure surface. The load pin includes a threaded shank adapted to provide a height adjustable connection with the measuring cell, preferably a measuring cell of a scale, and is connected to the base plate to provide an articulated support for a load. The pressure head of the load pin is inserted in the bore of the base plate with play and the base plate and pressure head are connected with each other by a resilient ring disposed between an annular groove defined in the base plate and an annular groove defined in the pressure head.

In addition, the annular grooves in the base plate and pressure head preferably have an identical width which is wider than the diameter of the resilient ring. The annular groove in the base plate has a planar surface and the annular groove in the pressure head has a concave surface with a taper on both sides in the region of the outer diameter of the bore or the pressure head, wherein the taper facing the pressure surface of the pressure head has a smaller scope than the taper facing the threaded shank. Furthermore, the width of the annular grooves in both the base plate and pressure head that exceeds the diameter of the resilient ring, preferably corresponds to the camber height of the effective contact surface of the pressure surface.

In one advantageous aspect, the support base in accordance with the present invention can carry a particularly heavy load. This is mainly the result of the relatively large contact area between the load pin and the base plate which distributes the load particularly uniformly. The support base in accordance with the present invention can carry a much heavier load than conventional support bases using a ball. The scale may also be designed to have a very small overall height.

In another advantageous aspect, the support joint is articulated which is important for compensating the effects caused by an uneven floor and for preventing the load from running off to the side. The resulting excursion does not change the height and the supporting contact area remains located substantially vertically beneath the load arm of the measuring cell. The measurement results are consequently unaffected. The combination of these features enhances the service value of the scale.

The construction of the support base is simple. The reduced complexity also the manufacturing costs of the base.

BRIEF DESCRIPTION OF THE DRAWINGS

The FIGURE shows a cross-sectional view of the support base in accordance with the present invention.

DETAILED DESCRIPTION OF THE PRESENTLY PREFERRED EMBODIMENTS

The support base in accordance with the present invention includes a base plate 1 and a load pin 2 that is under pressure. The load pin 2 has a threaded shank 3 that can be screwed in the measuring cell, and a pressure head 4 that is inserted in the base plate 1.

The threaded shank 3 is adapted to mate with a through hole or a blind hole located on the measuring cell. The shank's dimensions provide a variable insertion depth to allow sufficient height adjustment. A lock nut 5 provides a tight connection without clearance. If the measuring cell has a blind hole, then the thread length is rather short and the lock nut 5 is selected to be quite thick to occupy the space between the base plate 1 and the measuring cell and to provide additional support. If the measuring cell has a through hole, then a thinner lock nut 5 is employed.

The support joint is formed by the pressure head 4 in conjunction with a bore 6 located in the base plate 1. The front face of the pressure head 4 has a convex or ball shaped pressure surface 7, whereas the bore 6 has a planar pressure surface 8.

The base plate 1 and the load pin 2 are installed and secured with a resilient ring 9. Annular grooves 10 and 11 are formed in the bore 6 of the base plate 1 as well as on the pressure head 4. The spatial arrangement and the dimensions of the grooves 10 and 11 are matched to each other. The resilient ring 9 is arranged between the annular grooves 10 and 11.

The diameter of the pressure head 4 and the diameter of the bore 6 are coordinated to allow for a significant amount of play so that the load pin 2 can be displaced relative to the base plate 1. Moreover, the size and the shape of the annular grooves 10 and 11 meets specific design criteria. Both annular grooves 10 and 11 have approximately the same width, which exceeds the diameter of the resilient ring 9 by a predetermined amount. The annular groove 10 of the bore 6 has a flat base surface, whereas the annular groove 11 of the pressure head 4 has a concave base surface. Both sides of the concave base surface of the annular groove 11 are tapered in the region of the outer diameter of the pressure head 4. The slope of the taper of the annular groove 11 facing the pressure surface 7 of the pressure head 4 is smaller than that of the taper facing the threaded shank 3.

The base plate 1 includes a flexible cap 12 that can be detached. The cap 12 protects the base plate 1 and prevents the base plate 1 from sliding. The cap is preferably made of a rubberized material that compensates for different ground conditions. The cap 12 can be interchanged with other caps having different characteristics.

The support bases and the measuring cells are installed in the weighing platform during assembly in the factory. At the installation site, the threaded shank 3 is screwed into the measuring cell to an appropriate depth to adjust the height of the individual support bases depending on the local conditions. The shank 3 is subsequently locked. An uneven floor may cause the load pin 2 in one or several support bases to move relative to the base plate 1. When the two pressure surfaces 7 and 8 move relative to each other, the point contact between the pressure surfaces 7 and 8 of the load pin 2 and the base plate 1, respectively, move in the same direction and by the same amount as the displacement of the base plate. The contact surface is then always vertically directly beneath the connection point to the measuring cell. A lateral load bearing on the weighing platform can cause a similar displacement even if the support surface is flat. The movement of the contact surface also compensates for this unintended effect, so that the weight measurements remain unaffected.

What is claimed is:

1. A support base for a measuring cell comprising:
   a base plate with a bore having a first annular groove having a first dimension and being disposed in a first spacial arrangement in the bore and a planar pressure surface machined therein;
   a load pin connected to said base plate to provide articulated support for a load, said load pin having a threaded shank adaptable for adjusting its height relative to the measuring cell and terminating in a pressure head with a convex pressure surface and a second annular groove defined therein, said second annular groove having a second dimension and being disposed in a second spacial arrangement in the pressure head, the pressure head of said load pin being insertable with play into the bore of said base plate; and
   a resilient ring having a diameter, said resilient ring being disposed between the first and second annular grooves for connecting said base plate and the pressure head.

2. A support base in accordance with claim 1, wherein the first and second annular grooves are substantially equal in width, with each width being wider than the diameter of said resilient ring, the first annular groove having a substantially planar surface and the second annular groove having a concave surface, the concave surface of the second annular groove being tapered on both sides in a region of an outer diameter of one of the bore and the pressure head, and a portion of the taper facing the pressure surface of the pressure head having a smaller slope than a portion of the taper facing the threaded shank.

3. A support base in accordance with claim 2, wherein the width of the first and second annular grooves that exceeds the diameter of said resilient ring corresponds to a camber height of an effective contact surface of the pressure surface.

4. A support base in accordance with claim 1, wherein said support base is used with a measuring cell of a scale.

* * * * *